United States Patent Office 2,812,358
Patented Nov. 5, 1957

2,812,358

PRODUCTION OF HALF-ETHERS OF CYCLO-ALIPHATIC GLYCOLS

Otto Schlichting, Franz Westphal, Heinz Pachaly, and August Amann, Ludwigshafen (Rhine), Germany, assignors to Badische Anilin- & Soda-Fabrik Aktiengesellschaft, Ludwigshafen (Rhine), Germany No Drawing. Application August 30, 1956,
Serial No. 606,982

Claims priority, application Germany September 8, 1955

6 Claims. (Cl. 260—611)

This invention relates to new half-ethers of cycloaliphatic glycols and to an improved process for producing them.

We have found that new valuable half-ethers of cyclo-octane-diols-(1.2) are obtained by reacting epoxy-cyclo-octane in the presence of an acid catalyst with a hydroxy compound of the general formula HOR in which R represents an alkyl, alkenyl, alkinyl, aralkyl or cycloalkyl radical which may contain still further hydroxyl groups and/or alkoxy groups or halogen atoms.

The reaction proceeds according to the equation:

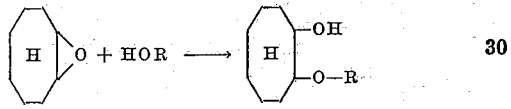

The epoxy-cyclo-octane is obtained in a specially simple way from cyclo-octene by oxidation with air or by means of performic acid.

As hydroxy compounds of the general formula HOR there are suitable for example methanol, ethanol, propanol, butanol, 2-ethylhexanol, n-octanol, isopropanol, isobutanol or isoamyl alcohol, and also singly unsaturated or poly-unsaturated alcohols, as for example allyl, crotyl or propargyl alcohol, butinol or geraniol, and also aromatic-aliphatic and cyclo-aliphatic alcohols, as for example phenyl ethyl alcohol, cyclopentanol, cyclohexanol, cycloheptanol or cyclo-octanol. There are also suitable, inter alia, glycols, such as ethylene, propylene or butylene glycols, glycerine, pentaerythritol, glycol monoethyl ethers, diglycol, ethylene chlorhydrin and glycerin-alpha- or -beta-chlor-hydrin. As acid catalysts there are suitable for example aluminum chloride, tin tetrachloride, boron trifluoride or sulfuric acid, the alcoholic component preferably being used in excess, for example 2 to 20 mols of the alcohol to each mol of epoxide. It is especially advantageous to use boron tri-fluoride complexes, as for example boron trifluoride etherate or boron trifluoride alcoholates, as acid catalysts. In general the reaction is carried out at temperatures of 10° to 100° C., preferably at 20° to 45° C.

The reaction may be carried out by dissolving the epoxycyclo-octane and the acid catalyst in an excess of the hydroxy compound and allowing the components to act on one another for several hours, if necessary with moderate heating. In order to avoid the formation of undesirable by-products, it is more preferable, however, to prepare a solution of the acid catalyst in an excess of hydroxy compound and to allow to flow gradually into this, while stirring well, the epoxy-cyclo-octane, if necessary diluted with further amounts of the hydroxy compound and/or with another inert solvent, as for example petroleum ether, benzene, ether, tetrahydrofurane, dioxane or carbon disulfide, during the course of several hours. After the end of the addition, the components are allowed to act upon one another for several hours further in order to complete the reaction; the reaction mixture is then neutralized by the addition of the equivalent amount of an inorganic or organic base, as for example sodium or potassium hydroxide, sodium or potassium carbonate, ethanolamine or diethanolamine, and the excess of the hydroxy compound is recovered by distillation and can be used for further reactions.

The new half-ethers of cyclo-octane-diol-(1.2) obtainable in this way are colorless, more or less viscous liquids which are suitable as intermediate products for the production of plastics and softeners. They exhibit a strong and prolonged pharmacological action similar to curare in that they cause a centrally-acting muscular relaxation. They are superior in this action to the known ortho-cresol glycerin ether. This superiority is illustrated by the following table in which column A gives the formula of the compound used, column B gives the toxicity measured in milligrams per kilogram of mouse, and column C gives the dose in milligrams per kilogram of mouse necessary to protect against death 60 minutes after administration of a lethal dose of cardiazole:

| A | B | C |
|---|---|---|
| (a) ⟨phenyl⟩—CH₃ / O—CH₂—CH—CH₂ / OH OH | 800 | 800 |
| (b) ⟨cyclo-octyl⟩—O—CH₂—CH₂—OH / OH | 1,600 | 800 |
| (c) ⟨cyclo-octyl⟩—O—CH₂—CH—CH₂ / OH OH / OH | 2,000 | 300 |
| (d) ⟨cyclo-octyl⟩—O—CH₂—C≡CH / OH | 1,600 | 75 |
| (e) ⟨cyclo-octyl⟩—O—CH₂—CH=CH₂ / OH | 1,600 | 200 |
| (f) ⟨cyclo-octyl⟩—O—CH₂—CH₂—CH₃ / OH | 1,600 | 800 |

The products (b) to (f), obtainable according to the present invention, are thus at least twice as low in toxicity as compared with the known product (a); of the products (c), (e) and especially (d), much smaller amounts are necessary in order to obviate the lethal action of cardiazole.

The following examples will further illustrate this invention but the invention is not restricted to these examples. The parts specified are parts by weight.

*Example 1.*—60 parts of boron trifluoride etherate are introduced into 1,200 parts of absolute methanol and, while stirring vigorously at 20° to 30° C., a solution of 300 parts of epoxy-cyclo-octane in 400 parts of absolute methanol is allowed to flow in during the course of 8 hours. After stirring overnight at room temperature, it is neutralized with 119 parts of diethanolamine and the excess methanol is distilled off. The residue is diluted with ether, the ethereal solution washed with water and dried over sodium sulfate. After evaporating the ether, the residue is distilled in vacuo. Besides a first runnings of 10 parts (boiling point 96° to 108° C. at 23 millimeters of mercury, absolute), there are obtained 330 parts of a colorless liquid which boils at 112° to 116° C. at 23 millimeters of mercury, absolute. By distilling again, there are obtained therefrom 324 parts of alpha-methoxy-cyclo-octanol of the boiling point 70° to 71° C. at 0.6 millimeters of mercury, absolute (D 20/4=1.004, $n_D^{20}$=1.4736).

In an analogous way there are obtained:

*Example 2—With normal-propanol.* — Alpha-propyloxycyclooctanol, boiling point 111° to 113° C. at 7 millimeters of mercury, absolute.

*Example 3—With allyl alcohol.*—Alpha-allyloxycyclo-octanol, boiling point 87° C. at 0.3 millimeters of mercury, absolute.

*Example 4—With normal-butanol.*—Alpha-normal-butoxycyclooctanol, boiling point 133° to 138° C. at 11.5 millimeters of mercury, absolute.

*Example 5—With normal-octyl alcohol.*—Alpha-normal-octyloxycyclo-octanol, boiling point 124° to 128° C. at 0.3 millimeters of mercury, absolute; D 20/4= 0.9289, $n_D^{20}$=1.4678.

*Example 6—With 2-ethylhexanol.*—Alpha-2-hexyloxycyclo-octanol boiling point 126° to 130° C. at 0.4 millimeters of mercury, absolute; D 20/4=0.9278, $n_D^{20}$= 1.3673.

*Example 7—With decyl alcohol.* — Alpha-decyloxycyclo-octanol, boiling point 165° to 170° C. at 0.8 millimeters of mercury, absolute; D 20/4=0.9196, $n_D^{20}$= 1.4682.

*Example 8—With phenyl ethyl alcohol.*—Alpha-phenethoxy-cyclo-octanol, boiling point 139° to 143° C. at 0.3 millimeters of mercury, absolute; D 20/4=1.0373, $n_D^{20}$=1.5242.

*Example 9—With isopropyl alcohol.*—Alpha-isopropyloxycyclo-octanol, boiling point 110° to 115° C. at 9 millimeters of mercury, absolute; D 20/4=0.9603, $n_D^{20}$= 1.4656.

*Example 10—With propargyl alcohol.*—Alpha-propargyloxycyclo-octanol, boiling point 90° to 96° C. at 0.2 millimeters of mercury, absolute.

*Example 11.*—About 2 parts of boron trifluoride are led into 160 parts of absolute methanol during the course of a few minutes while cooling, and then during the course of 3 hours a solution of 50 parts of epoxy-cyclo-octane in 160 parts of methanol is allowed to flow in at 25° C. while stirring. The solution is allowed to stand overnight, 30 parts of water are then added and the excess methanol is distilled off in vacuo. The residue is dissolved in chloroform and the solution is washed with sodium carbonate solution, dried over sodium sulfate and the chloroform distilled off in vacuo. By distillation at an oil pump, there are obtained from the residue 51 parts of alpha-methoxycyclo-octanol which is identical with the product obtained according to Example 1.

*Example 12.*—A solution of 43 parts of epoxycyclo-octane in 40 parts of absolute alcohol is allowed to flow during 45 minutes into a boiling solution of 0.9 part of concentrated sulfuric acid in 80 parts of absolute alcohol. To complete the reaction, the whole is heated at the boiling point for 1½ hours and then the excess alcohol is distilled off in vacuo. The residue is dissolved in chloroform, the solution washed with soda solution and dried over sodium sulfate. After evaporating the chloroform, the components boiling below 150° C. at 0.5 millimeters of mercury, absolute are distilled off from the residue, and the remainder is subjected to fractional distillation.

There are thereby obtained 3 parts of first runnings (boiling point 43.5° to 70° C. at 11 millimeters of mercury, absolute and then 25 parts of alpha-ethoxycyclo-octanol (boiling point 73° to 77.5° C. at 1.3 millimeters of mercury, absolute) and 6 parts of last runnings (boiling points 78° to 148° C. at 1.1 millimeters of mercury, absolute).

*Example 13.*—25 parts of boron trifluoride etherate are dissolved in 240 parts of cyclohexanol and a solution of 126 parts of epoxycyclo-octane in 80 parts of cyclohexanol is allowed to flow in during the course of 5 hours while stirring vigorously at 30° to 35° C. The mixture is allowed to stand overnight, 37 parts of diethanolamine are added and the excess cyclohexanol is distilled off with steam. By distillation in an oil pump vacuum there are obtained from the residue 110 parts of alpha-cyclohexyloxycyclo-octanol as a colorless viscous liquid which boils at 110° to 118° C. at 0.2 millimeters of mercury, absolute D 20/4=1.0074, $n_D^{20}$=1.4917.

*Example 14.*—40 parts of boron trifluoride etherate are dissolved in 400 parts of anhydrous glycerine and then a solution of 126 parts of epoxycyclo-octane in 83 parts of dioxane are allowed to flow in during the course of 3½ hours while stirring vigorously at 25° C. The whole is further stirred overnight and then neutralized by the addition of about 200 parts of a 20 percent soda solution and the organic reaction product is taken up in chloroform by repeated shaking therewith. After drying the solution over sodium sulfate, the glycerine used in excess is first distilled off and the residue is then subjected to a fractional distillation. 100 parts of 2-hydroxycyclo-octanol-(1)-glycerine ether are thus obtained as a colorless, very viscous liquid which boils at 180° to 190° C. at 0.3 millimeters of mercury, absolute.

In the same way 65 parts of 2-hydroxycyclo-octanol glycol ether which boils at 126° to 134° C. at 0.2 millimeters of mercury, absolute are obtained from 60 parts of epoxycyclo-octane and anhydrous glycol.

*Example 15.*—A solution of 100 parts of epoxycyclo-octane in 100 parts of glycerine-alpha-monochlorhydrin is allowed to flow during the course of 6 hours into a solution of 32 parts of boron trifluoride etherate in 300 parts of glycerine-alpha-mono-chlorhydrin at 30° to 40° C. while stirring vigorously. The whole is further stirred for 24 hours at room temperature and then 47.5 parts of diethanolamine are added thereto and the excess glycerine-alpha-monochlorhydrin is distilled off in vacuo. The residue is diluted with ether, the ethereal solution washed with water and dried over sodium sulfate. After evaporating the ether, the residue is distilled at an oil pump and 71 parts of 2-hydroxycyclo-octanol-(1)-glycerine-gamma-monochlohydrin ether are obtained as a colorless viscous liquid which boils at 152° to 157° C. at 0.3 millimeters of mercury, absolute.

What we claim is:

1. A compound of the general formula

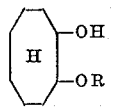

in which R represents a member of the class consisting of alkyl, alkenyl, alkinyl, aralkyl, cycloalkyl, hydroxylated alkyl and chlorohydroxyalky groups.

2. A process for the production of half-ethers of the general formula

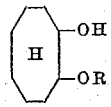

in which R represents a member of the class consisting of alky, akenyl, alkinyl, aralkyl, cycloalkyl, hydroxylated alkyl and chlorohydroxyalkyl groups which process comprises reacting at from about 10° up to about 100° C. epoxy-cyclo-octane with about 2 to 20 mols of a hydroxy compound of the general formula ROH in which R has the meaning indicated above in the presence of an acid catalyst.

3. Cyclooctane-diol-(1.2)-monopropargyl ether.
4. Cyclooctane-diol-(1.2)-monoallylether.
5. Cyclooctane-diol-(1.2)-monoglycerin ether.
6. Cyclooctane-diol-(1.2)-monoglycerin-monochlorhydrin ether.

References Cited in the file of this patent

UNITED STATES PATENTS

| | | |
|---|---|---|
| 2,327,053 | Marple et al. | Aug 17, 1943 |
| 2,500,016 | Allenby | Mar. 7, 1950 |
| 2,769,017 | Reppe et al. | Oct. 30, 1956 |

OTHER REFERENCES

Craig, Chemical Reviews, vol. 49 (1951), p. 103–236 (p. 145, 166, 167 particularly).

Jones, Chemical Abstracts, vol. 49; 4546, 7; 4610 (1955).